United States Patent
Ueki

(10) Patent No.: US 10,911,953 B2
(45) Date of Patent: Feb. 2, 2021

(54) IN-VEHICLE AUTHENTICATION DEVICE AND PORTABLE DEVICE AUTHENTICATION METHOD

(71) Applicant: DENSO CORPORATION, Kariya (JP)

(72) Inventor: Tatsuya Ueki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/699,982

(22) Filed: Dec. 2, 2019

(65) Prior Publication Data
US 2020/0107194 A1   Apr. 2, 2020

Related U.S. Application Data

(63) Continuation of application No. PCT/JP2018/012264, filed on Mar. 27, 2018.

(30) Foreign Application Priority Data

Jun. 9, 2017   (JP) ................. 2017-114776

(51) Int. Cl.
*H04W 12/06* (2009.01)
*H04W 4/48* (2018.01)
(Continued)

(52) U.S. Cl.
CPC ........... *H04W 12/06* (2013.01); *B60R 25/245* (2013.01); *H04B 1/3822* (2013.01);
(Continued)

(58) Field of Classification Search
CPC ............. H04W 4/00–046; H04W 4/30; H04W 4/38–80; H04B 17/318; H04B 1/3822; B60R 25/245

See application file for complete search history.

(56) References Cited

U.S. PATENT DOCUMENTS

2007/0057765 A1* 3/2007 Ogino ................... B60R 25/245
340/5.61
2015/0332530 A1* 11/2015 Kishita .............. G07C 9/00182
70/256
(Continued)

FOREIGN PATENT DOCUMENTS

JP          H11101033 A    4/1999
JP          2005325540 A  11/2005
(Continued)

OTHER PUBLICATIONS

U.S. Appl. No. 16/700,186, filed Dec. 2, 2019, Ueki.

*Primary Examiner* — San Htun
(74) *Attorney, Agent, or Firm* — Harness, Dickey & Pierce, P.L.C.

(57) ABSTRACT

An in-vehicle authentication device may perform wireless communication with a portable device in a vicinity of a vehicle. The in-vehicle authentication device may transmit a call signal that requests a reply of a response signal to the portable device. The in-vehicle authentication device may transmit an authentication request signal that requests a reply of an authentication signal to the portable device when the in-vehicle authentication device determines that the portable device exists in the vicinity of the vehicle by receiving the response signal. The in-vehicle authentication device may authenticate the portable device that transmits the authentication signal based on the authentication signal when the authentication signal is received.

5 Claims, 14 Drawing Sheets

(51) Int. Cl.
  *H04B 17/318* (2015.01)
  *H04W 12/00* (2021.01)
  *B60R 25/24* (2013.01)
  *H04B 1/3822* (2015.01)

(52) U.S. Cl.
  CPC ............ *H04B 17/318* (2015.01); *H04W 4/48* (2018.02); *H04W 12/00503* (2019.01)

(56) References Cited

U.S. PATENT DOCUMENTS

| | | |
|---|---|---|
| 2016/0125722 A1 | 5/2016 | Ueki et al. |
| 2016/0200291 A1* | 7/2016 | Kim ........................ B60R 25/20 701/2 |
| 2016/0275732 A1 | 9/2016 | Tomita et al. |

FOREIGN PATENT DOCUMENTS

| | | | |
|---|---|---|---|
| JP | 2012227586 A | 11/2012 |
| JP | 2015003545 A | 1/2015 |
| JP | 2016074377 A | 5/2016 |
| JP | 2016178617 A | 10/2016 |

* cited by examiner

IN-VEHICLE AUTHENTICATION DEVICE AND PORTABLE DEVICE AUTHENTICATION METHOD

CROSS REFERENCE TO RELATED APPLICATIONS

The present application is a continuation application of International Patent Application No. PCT/JP2018/012264 filed on Mar. 27, 2018, which designated the U.S. and claims the benefit of priority from Japanese Patent Application No. 2017-114776 filed on Jun. 9, 2017. The entire disclosures of all of the above applications are incorporated herein by reference.

TECHNICAL FIELD

The present disclosure relates to an in-vehicle authentication device and a portable device authentication method each of which authenticates a portable device existing in a vicinity of a vehicle by performing wireless communication with the portable device.

BACKGROUND

In order to solve a burdensome problem of taking out a key and unlocking a door each time a passenger gets into the vehicle, a technique called passive entry has been developed. With the passive entry, the vehicle detects approach of the key and automatically unlocks the door. This technique is widely used.

SUMMARY

The present disclosure provides an in-vehicle authentication device. The in-vehicle authentication device may perform wireless communication with a portable device in a vicinity of a vehicle. The in-vehicle authentication device may transmit a call signal that requests a reply of a response signal to the portable device. The in-vehicle authentication device may transmit an authentication request signal that requests a reply of an authentication signal to the portable device when the in-vehicle authentication device determines that the portable device exists in the vicinity of the vehicle by receiving the response signal. The in-vehicle authentication device may authenticate the portable device that transmits the authentication signal based on the authentication signal when the authentication signal is received.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1A:
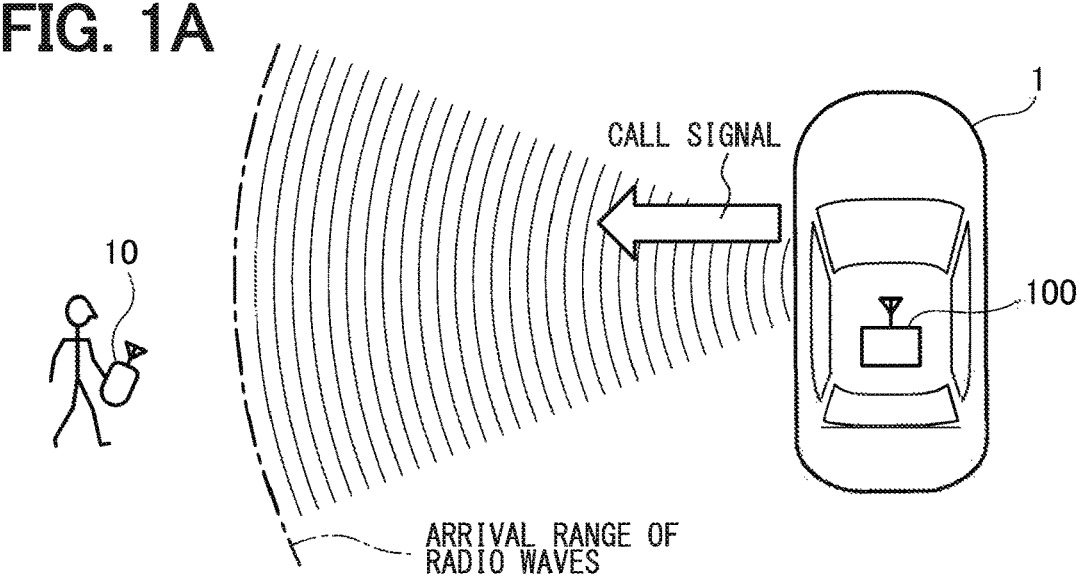
FIG. 1A is a diagram showing a situation in which the portable device does not exist within a reach of radio wave from an in-vehicle authentication device.

For example, in the passive entry, a wireless communication device (hereinafter referred to as an in-vehicle authentication device), which is mounted on the vehicle and has an authentication function, communicates with a small wireless communication device (hereinafter referred to as a portable device) carried by a person trying to get into the vehicle. The in-vehicle authentication device authenticates whether the portable device is a genuine portable device. When the authentication succeeds and the in-vehicle authentication device authenticates that the portable device is a genuine portable device, the door of the vehicle is unlocked or unlock is prepared.

In order to realize the above-described configuration, the in-vehicle authentication device transmits a call signal (so-called a Wake signal) to the portable device existing in the surroundings at a certain cycle, and the portable device that has received the call signal from the in-vehicle authentication device transmits a response signal (so-called an Ack signal). When a portable device exists in the vicinity, the response signal from the portable device is returned. Therefore, the in-vehicle authentication device can determine the presence or absence of a portable device in the vicinity based on the presence or absence of the response signal. When the portable device exists in the vicinity, the in-vehicle authentication device transmits an authentication request signal (so-called a Challenge signal) that requests a response of the authentication signal. The portable device that has received the authentication request signal transmits the requested authentication signal (so-called a Response signal). The in-vehicle authentication device authenticates the portable device using the authentication signal. When the authentication succeeds, the in-vehicle authentication device outputs the fact to an in-vehicle device that controls the unlocking of the door.

When the authentication succeeds, a genuine portable device is present in the vicinity. Thereafter, it is not necessary to transmit the call signal at a constant cycle. On the other hand, when the authentication fails, the in-vehicle authentication device continues to transmit the call signal at a constant period in preparation for a case where a genuine portable device approaches.

Thus, in order for the in-vehicle authentication device to authenticate the portable device, the in-vehicle authentication device and the portable device need to communicate wirelessly. In particular, since the portable device is used by being carried, electric power is provided by a battery, so that there is a strong demand for reducing battery consumption.

A technique has been proposed that pays attention to the fact that a portable device is carried when it is used. A vibration sensor is built in the portable device. When no vibration is detected, it is determined that the portable device is not used, so that the response signal is not transmitted even when the call signal is received from the in-vehicle authentication device. In the proposed technique, when the portable device is not used, such as when the portable device is placed on a desk, a situation where the response signal is returned each time the call signal is received from the in-vehicle authentication device and the battery is consumed can be reduced.

Even when the proposed technique described above is employed, there are still cases where the battery of the portable device is abnormally consumed.

Normally, an authentication request signal has a larger data amount than a call signal. For this reason, depending on the state of the portable device, the reception sensitivity may decrease during reception of the authentication request signal. In this configuration, the reception of the authentication request signal may not be completed and the authentication signal may not be returned. It is found that the battery of the portable device may be consumed suddenly.

The present disclosure provides an in-vehicle authentication device and a portable device authentication method each of which can more reliably reduce battery consumption of the portable device.

An example embodiment of the present disclosure provides an in-vehicle authentication device. The in-vehicle authentication device includes a wireless communication unit, a call signal transmission unit, an authentication request signal transmission unit, and an authentication execution unit. The wireless communication unit performs wireless communication with a portable device in a vicinity of a vehicle. The call signal transmission unit transmits a call signal that requests a reply of a response signal to the portable device via the wireless communication unit. The authentication request signal transmission unit transmits an authentication request signal that requests a reply of an authentication signal via the wireless communication unit when the response signal is received via the wireless communication unit. The authentication execution unit configured to authenticate the portable device that transmits the authentication signal based on the authentication signal when the authentication signal is received via the wireless communication unit. The wireless communication unit transmits the authentication request signal with a signal strength greater than a signal strength of the call signal.

In the example embodiment of the present disclosure, the signal strength of the authentication request signal is greater than the signal strength of the call signal. Thus, the configuration can reduce a situation at which the authentication request signal cannot be received even though the call signal can be received. As a result, the configuration can reduce a situation where the battery of the portable device is suddenly consumed.

Another example embodiment of the present disclosure provides a portable device authentication method. A portable device authentication method includes: performing wireless communication with a portable device existing in a vicinity of a vehicle; transmitting a call signal that requests a reply of a response signal to the portable device; determining whether the response signal is received; transmitting an authentication request signal that requests a reply of an authentication signal with a signal strength greater than a signal strength of the call signal when the response signal is received; and authenticating the portable device that transmits the authentication signal based on the authentication signal when the authentication signal is received.

In the example embodiment of the present disclosure, the signal strength of the authentication request signal is greater than the signal strength of the call signal. Thus, the configuration can reduce a situation at which the authentication request signal cannot be received even though the call signal can be received. As a result, the configuration can reduce a situation where the battery of the portable device is suddenly consumed.

Hereinafter, embodiments will be described in order to clarify the contents of the present disclosure described above.

Figure 1B:
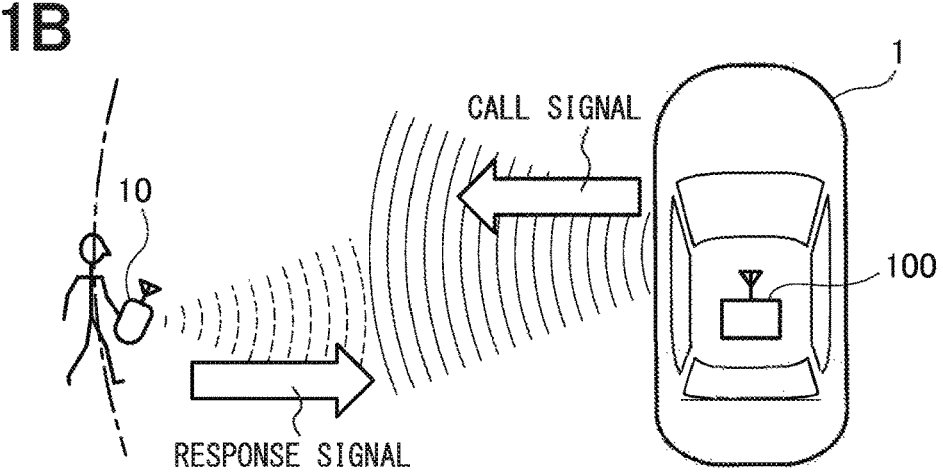
FIG. 1B is a diagram showing a situation in which the portable device is entering the reach of radio wave from the in-vehicle authentication device.
Figure 1C:
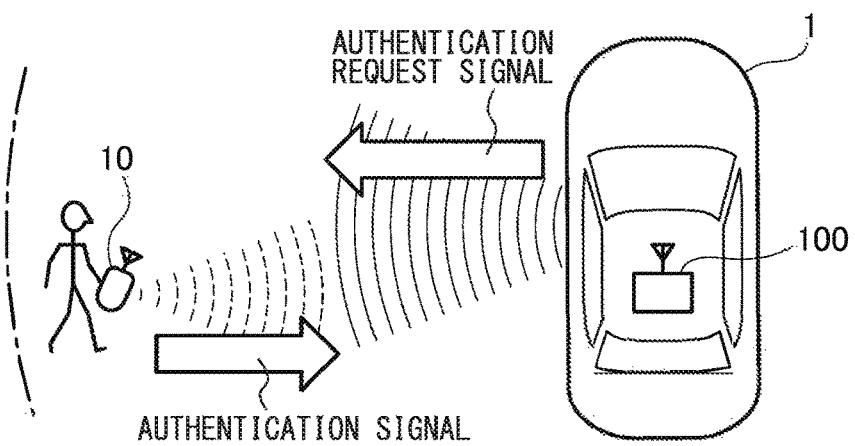
FIG. 1C is a diagram showing a situation in which the in-vehicle authentication device authenticates the users portable device.

FIGS. 1A to 1C exemplify a configuration in which an in-vehicle authentication device 100 of the present embodiment mounted on a vehicle 1 authenticates a users portable device 10. As shown in the figures, the in-vehicle authentication device 100 periodically transmits a call signal (known as a Wake signal) that requests a response of a response signal to the portable device 10 existing in a vicinity of the vehicle 1. As shown in FIG. 1A, when the portable device 10 does not exist within a reachable range of the radio wave transmitted from the in-vehicle authentication device 100, the call signal does not reach the portable device 10, so that the portable device 10 does not transmit the response signal. As shown in FIG. 1B, when the portable device 10 enters the reachable range of the radio wave transmitted from the in-vehicle authentication device 100, the portable device 10 receives the call signal from the in-vehicle authentication device 100 and transmits a response signal (known as an Ack signal) in response to the call signal.

When the in-vehicle authentication device 100 receives the response signal, the in-vehicle authentication device 100 recognizes that the portable device 10 has approached the reachable range of the radio wave. Thus, the in-vehicle authentication device 100 transmits an authentication request signal (known as a Challenge signal) that requests a response of an authentication signal, as shown in FIG. 1C, so as to authenticate the portable device 10. Since the authentication signal (known as a Response signal) is transmitted from the portable device 10, the in-vehicle authentication device 100 authenticates the portable device 10 based on the authentication signal.

As described above, even though the in-vehicle authentication device 100 of the vehicle 1 needs to periodically transmit the call signal, the portable device 10 transmits a response signal or an authentication signal when respectively receiving the call signal or the authentication request signal. Therefore, the power consumption of the portable device 10 can be reduced. However, for some reason, it has been observed that the power consumption of the portable device 10 suddenly increases, and the battery is consumed. Therefore, the in-vehicle authentication device 100 of the present embodiment has the following internal structure in order to take measures against such a difficulty by the vehicle 1.

Figure 2:
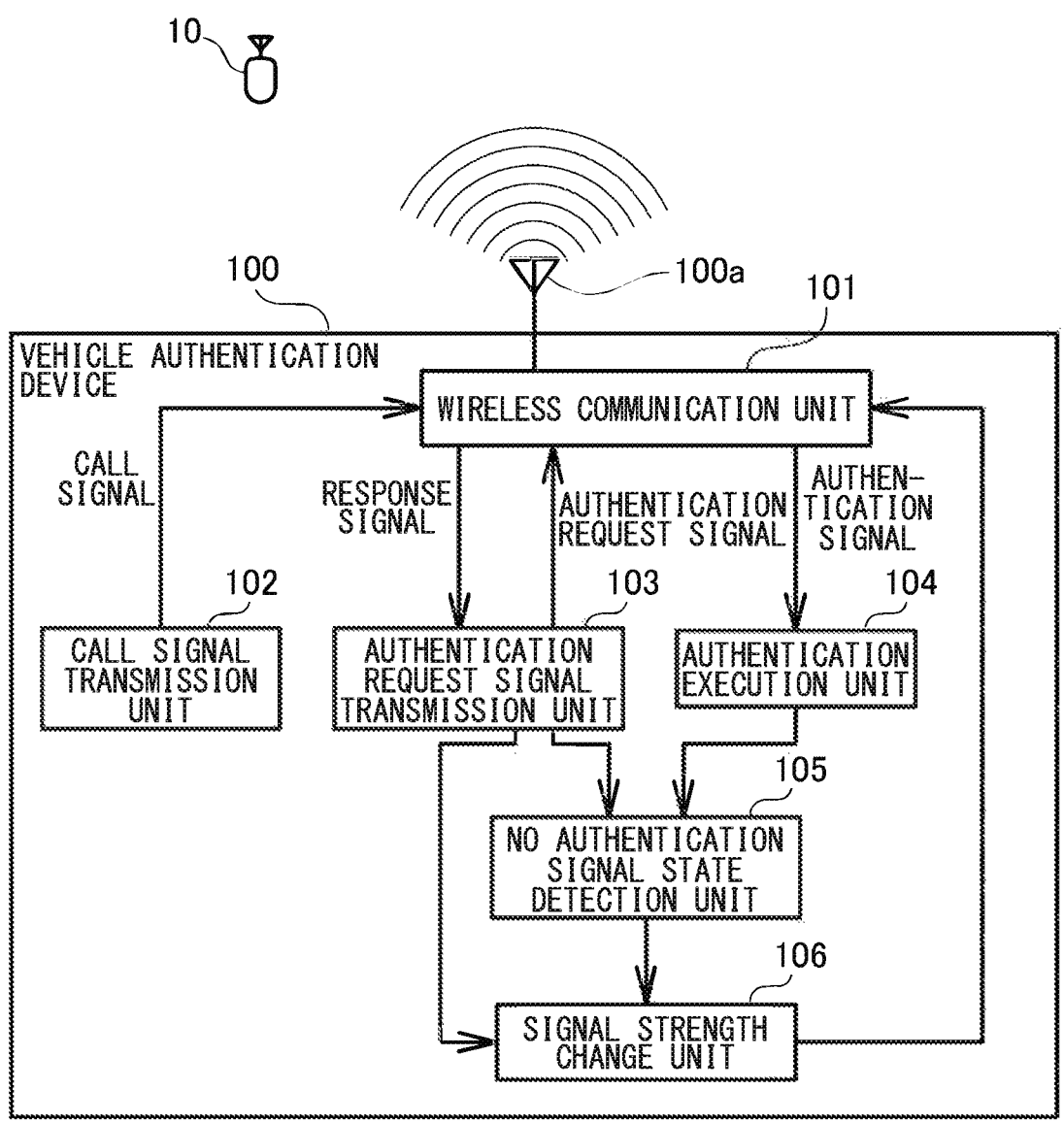
FIG. 2 is a diagram showing an internal structure of the in-vehicle authentication device according to a present embodiment.

FIG. 2 shows the internal structure of the in-vehicle authentication device 100 according to the present embodiment. As shown in the figure, the in-vehicle authentication device 100 of the present embodiment includes a wireless communication unit 101, a call signal transmission unit 102, an authentication request signal transmission unit 103, an authentication execution unit 104, a no-authentication signal state detection unit 105, a signal strength change unit 106, or the like.

These "units" are an abstract concept classifying the inside of the in-vehicle authentication device 100 for the sake of convenience, and does not represent that the in-vehicle authentication device 100 is physically divided into these "units". In the classification, functions included in the in-vehicle authentication device 100 is focused in order that the in-vehicle authentication device 100 takes measures against the increase in power consumption of the portable device 10. Those "units" can be realized as a computer program executed by a CPU, can be realized as an electronic circuit including an LSI, or can be realized as a combination of the computer program with the electronic circuit.

The wireless communication unit 101 is connected to an antenna 100a of the in-vehicle authentication device 100. The wireless communication unit 101 drives the antenna 100a to transmit a radio wave or receive a radio wave.

The call signal transmission unit 102 periodically transmits a call signal to the wireless communication unit 101. When the wireless communication unit 101 receives the call signal from the call signal transmission unit 102, the wireless communication unit 101 drives the antenna 100a in response to the call signal to wirelessly transmit the radio wave of the call signal. When the radio wave of the response signal is returned from the portable device 10 that has received the call signal, the wireless communication unit 101 receives the response signal using the antenna 100a and transmits the response signal to the authentication request signal transmission unit 103.

The authentication request signal transmission unit 103 transmits an authentication request signal to the wireless communication unit 101 after receiving the response signal from the wireless communication unit 101. The authentication request signal transmission unit 103 transmits the information to the effect that the authentication request signal transmission unit 103 has transmitted the authentication request signal to the no-authentication signal state detection unit 105. When the wireless communication unit 101 receives the authentication request signal from the authentication request signal transmission unit 103, the wireless communication unit 101 drives the antenna 100a in response to the authentication request signal to wirelessly transmit the radio wave of the authentication request signal. When the radio wave of the authentication signal is returned from the portable device 10 that has received the authentication request signal, the wireless communication unit 101 receives the authentication signal using the antenna 100a and transmits the authentication signal to the authentication execution unit 104.

The authentication execution unit 104 transmits the information to the effect that the authentication execution unit 104 has received the authentication signal to the no-authentication signal state detection unit 105 and authenticates, based on the authentication signal, the portable device 10 that has transmitted the authentication signal after receiving the authentication signal from the wireless communication unit 101.

The no-authentication signal state detection unit 105 is connected to the authentication request signal transmission unit 103 and the authentication execution unit 104. The no-authentication signal state detection unit 105 receives the information to the effect that the authentication request signal transmission unit 103 has transmitted the authentication request signal (that is, the information to the effect that the authentication request signal transmission unit 103 has transmitted the radio wave of the authentication request signal) and the information to the effect that the authentication execution unit 104 has received the authentication signal. Based on the information, the no-authentication signal state detection unit 105 detects a state in which the authentication signal is not returned even though the response signal is returned from the portable device 10 (hereinafter referred to as a no-authentication signal state). That is, since the authentication request signal is transmitted when the response signal from the portable device 10 is received, the fact that the authentication request signal is transmitted indicates that the portable device 10 exists within the radio wave reachable range and the response signal from the portable device 10 is received. When the authentication request signal is transmitted in such a situation, it is assumed that the authentication signal will be returned in response to the authentication request signal. The no-authentication signal state detection unit 105 detects the state in which the authentication signal has not been received even in the above described situation.

It has been described that information indicating that the authentication request signal has been transmitted is output from the authentication request signal transmission unit 103 to the no-authentication signal state detection unit 105. The response signal is received before the authentication request signal is transmitted. In this configuration, the authentication request signal transmission unit 103 may transmit the information to the effect that the authentication request signal transmission unit 103 has received the response signal instead of the information to the effect that the authentication request signal transmission unit 103 has transmitted the authentication request signal to the no-authentication signal state detection unit 105. In this case, the no-authentication signal state detection unit 105 detects, as the no-authentication signal state, the state in which the no-authentication signal state detection unit 105 does not receive the information to the effect that the authentication signal is received from the authentication execution unit 104 even though the no-authentication signal state detection unit 105 receives the information to the effect that the response signal is received from the authentication request signal transmission unit 103.

The information to the effect that the response signal is received and the information to the effect that the authentication request signal is transmitted may be transmitted from the authentication request signal transmission unit 103 to the no-authentication signal state detection unit 105.

When the signal strength change unit 106 receives the information whether the no-authentication signal state is detected from the no-authentication signal state detection unit 105, the signal strength changing unit 106 determines whether to change the output strength of the authentication request signal. For example, when the no-authentication signal state continues for a predetermined number of times of 1 or more, the signal strength change unit 106 determines that the output strength of the authentication request signal is to be increased, and outputs the fact to the wireless communication unit 101. The signal strength change unit 106 may receive, from the authentication request signal transmission unit 103, the information to the effect that the authentication request signal is transmitted. In this case, when the number of the transmission of the authentication request signal in the state where the output strength is increased reaches a predetermined number of times, the signal strength change unit 106 may restore the output strength to the normal strength.

The in-vehicle authentication device 100 according to the present embodiment having the internal structure as described above can reduce sudden consumption of the battery of the portable device 10. The reason will be described below.

Figure 3A:
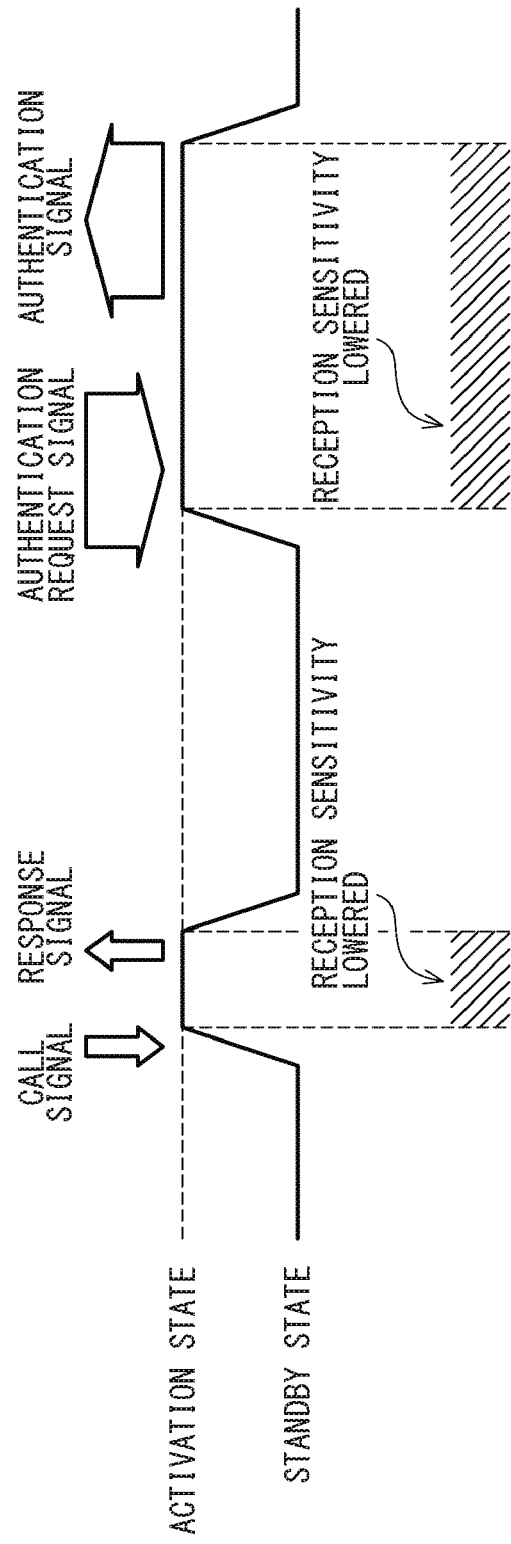
FIG. 3A is a timing chart showing states of the portable device when an authentication is performed with the in-vehicle authentication device.
Figure 3B:
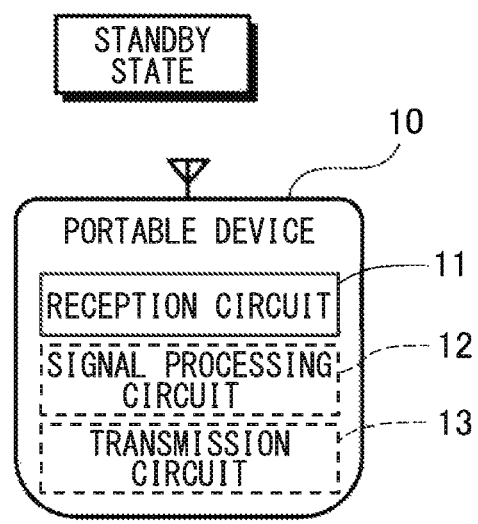
FIG. 3B is a diagram showing a standby state of the portable device.
Figure 3C:
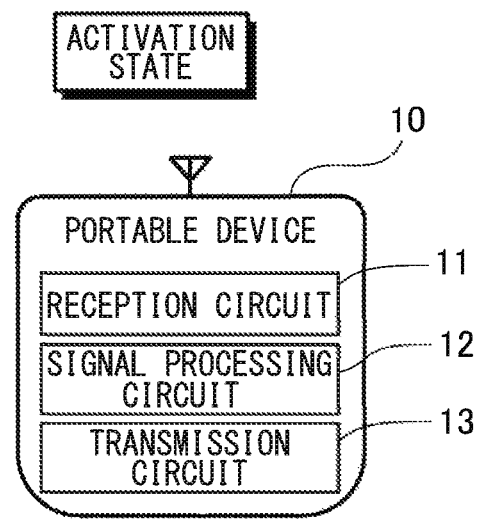
FIG. 3C is a diagram showing an activation state of the portable device.

FIGS. 3A to 3C show the operation of the portable device 10 for performing the authentication with the in-vehicle authentication device 100. As shown in FIG. 3A, the portable device 10 performs the transmission and reception of the radio wave between the in-vehicle authentication device 100 while repeating the standby state and the activation state. The portable device 10 includes a reception circuit 11, a signal processing circuit 12, and a transmission circuit 13. The reception circuit 11 receives the radio wave. The signal processing circuit 12 processes the received radio wave. The transmission circuit 13 transmits the radio wave. As shown in FIG. 3B, the standby state indicates that the reception circuit 11 is operating but the signal processing circuit 12 and a transmission circuit 13 are not operating. Since the signal processing circuit 12 and the transmission circuit 13 need to operate after receiving the radio wave, the operation is stopped until the radio wave is received. Thus, the configuration can reduce the consumption of the battery. On the other hand, the reception circuit 11 operates so that the call signal from the in-vehicle authentication device 100 can be received whenever it arrives. Such a state is the standby state.

In FIG. 3B, the reception circuit 11 is represented by a solid line, and the signal processing circuit 12 and the transmission circuit 13 are represented by broken lines. FIG. 3B shows the state in which the reception circuit 11 is operating but the signal processing circuit 12 and the transmission circuit 13 are not operating.

Then, as shown in FIG. 3A, when the portable device 10 receives the call signal from the in-vehicle authentication device 100 in the standby state, the portable device 10 becomes the activation state. As shown in FIG. 3C, in the activation state of the portable device 10, the signal processing circuit 12 and the transmission circuit 13 are operating. The portable device 10 is capable of performing the predetermined signal processing in response to the received call signal and transmitting the response signal. As shown in FIG. 3A, after transmitting the response signal, the portable device 10 returns to the standby state.

Thereafter, when the authentication request signal transmitted from the in-vehicle authentication device 100 in response to the response signal is received, the portable device 10 becomes the activation state. Then, the portable device 10 performs the predetermined signal processing on the authentication request signal, transmits the authentication signal, and then restores the state to the standby state.

Here, when the standby state is switched to the activation state, the operation of the signal processing circuit 12 and the transmission circuit 13 that have been stopped is started, so that the current consumption in the portable device 10 increases. As a result, it has been found that the amount of current supplied to the reception circuit 11 is insufficient, and the reception sensitivity for the radio wave decreases. This phenomenon has been overlooked for a long time because the phenomenon does not occur while the battery of the portable device 10 is new. When the battery is used for a while and the current supply capability starts to decrease, the reception sensitivity decreases by about 1 db.

Since the call signal (so-called a Wake signal) is provided by a short signal with a small amount of data, as shown in FIG. 3A, the reception is completed before the operation of the signal processing circuit 12 and the transmission circuit 13 starts (that is, before the reception sensitivity decreases). On the other hand, since the authentication request signal (so-called a Challenge signal) is provided by a long signal with a large amount of data, the reception will not be completed before the operation of the signal processing circuit 12 and the transmission circuit 13 starts. As a result, even when the signal processing circuit 12 and the transmission circuit 13 operates and the reception sensitivity is lowered, the reception is continued, and in some cases, the authentication request signal may not be received.

Even when such a phenomenon occurs, in many cases, the owner of the portable device 10 approaches the vehicle 1, so that the above described situation does not occur. When the owner of the portable device 10 stops on the way to the vehicle 1, a situation may occur in which the power consumption of the portable device 10 is greatly increased and the battery is suddenly consumed.

Figure 4A:
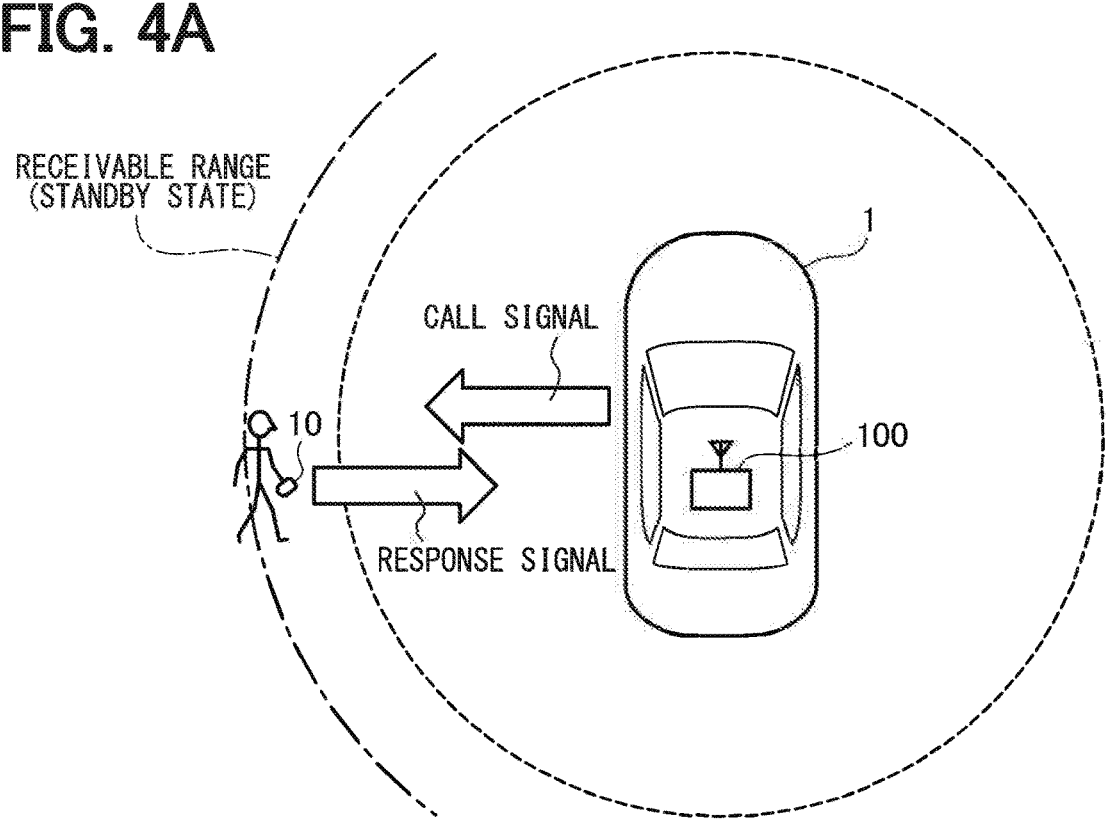
FIG. 4A is a diagram showing a situation in which the portable device is entering a receivable range of the standby state for radio wave from the in-vehicle authentication device.
Figure 4B:
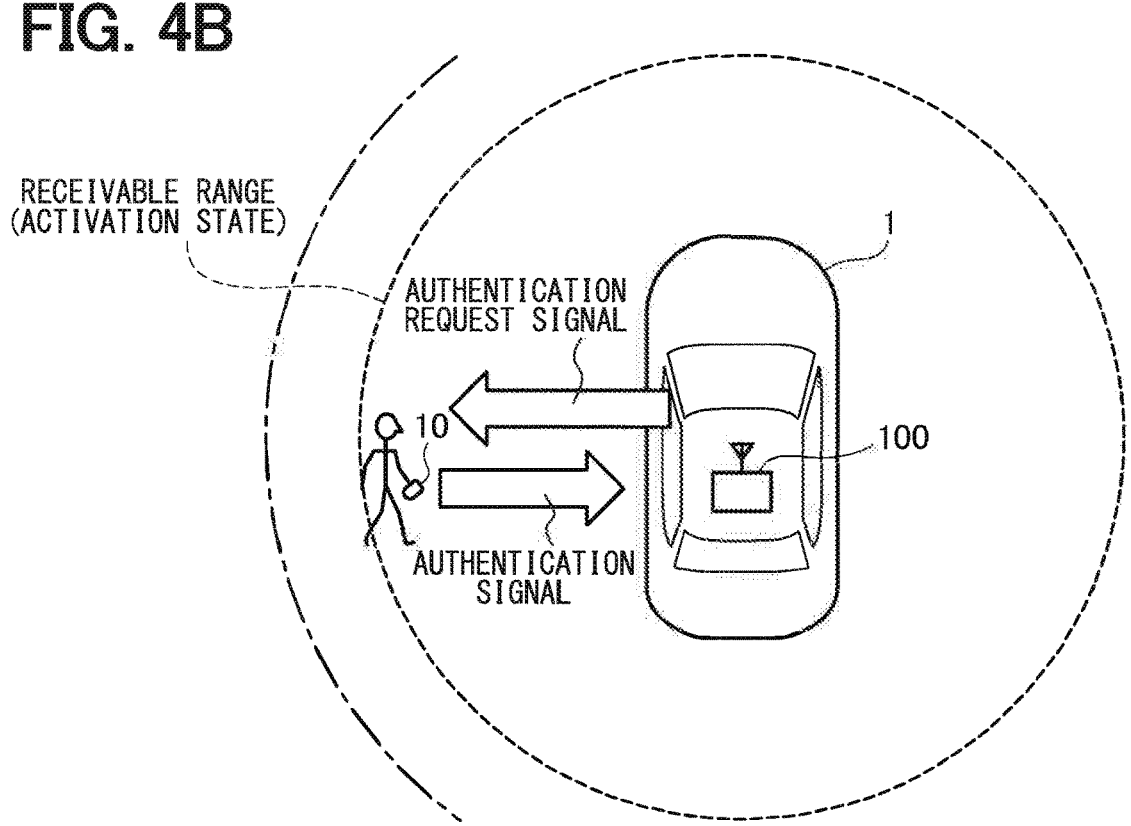
FIG. 4B is a diagram showing a situation in which the portable device is entering a receivable range of the activation state for radio wave from the in-vehicle authentication device.

FIGS. 4A and 4B show a state in which the in-vehicle authentication device 100 authenticates the portable device 10 in a situation where the owner of the portable device 10 approaches the vehicle 1. A range shown by the dash-dot line in FIGS. 4A and 4B indicates a receivable range for the radio wave transmitted from the in-vehicle authentication device 100 when the portable device 10 is in the standby state. A range shown by the broken line indicates a receivable range for the radio wave when the portable device 10 is in the activation state. As described above, when the portable device 10 is in the activation state, the reception sensitivity is lower than that in the standby state. Therefore, the receivable range in the activation state shown by the broken line is smaller than the receivable range in the standby state shown by the dash-dot line.

As shown in FIG. 4A, when the portable device 10 enters the receivable range in the standby state, the portable device 10 is capable of receiving the call signal from the in-vehicle authentication device 100. Since the call signal is the short signal, the reception is immediately completed, and the portable device 10 transmits the response signal to the in-vehicle authentication device 100. Then, the authentication request signal is transmitted from the in-vehicle authentication device 100.

The owner of the portable device 10 may be approaching the vehicle 1. In this case, the portable device 10 receives the call signal from the in-vehicle authentication device 100 and transmits the response signal. The portable device 10 moves to the receivable range in the activation state shown by the broken line while the authentication request signal in response to the response signal is received. With this configuration, as shown in FIG. 4B, the portable device 10 can receive the authentication request signal from the in-vehicle authentication device 100 and transmit the authentication signal in response to the authentication request signal.

Figure 5A:
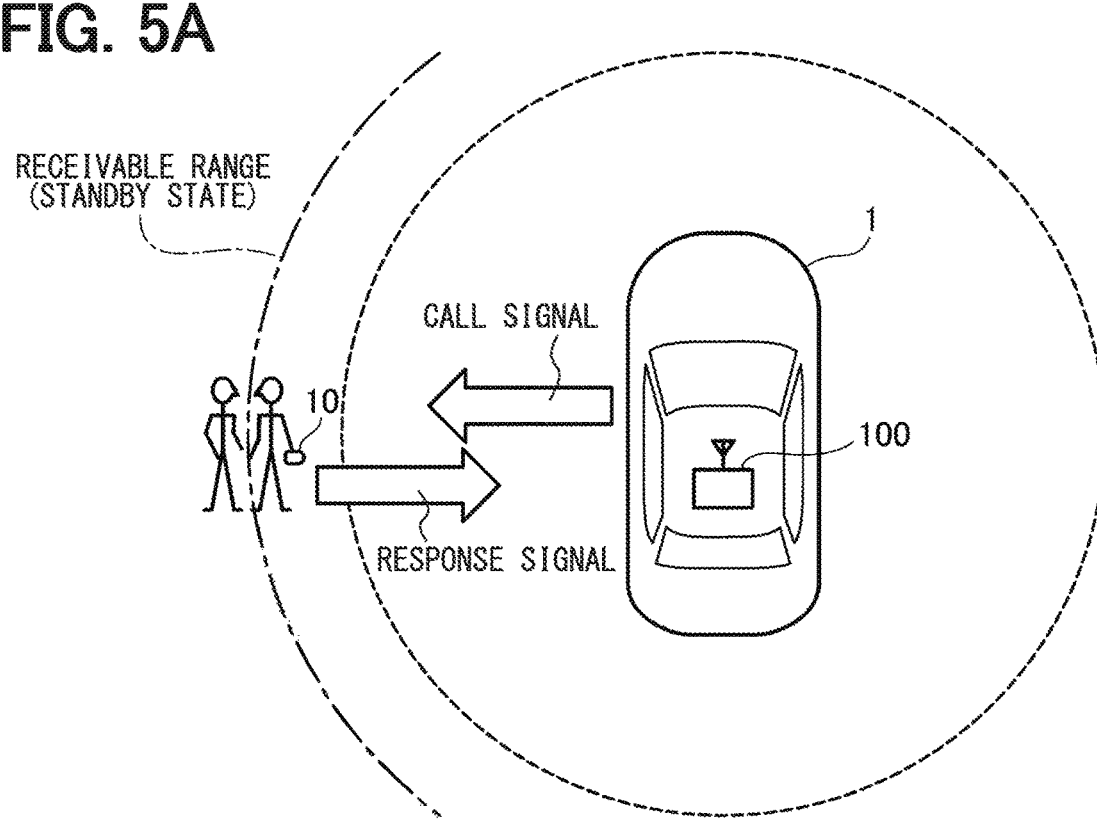
FIG. 5A is a diagram showing a situation in which the portable device exists between the receivable range in the standby state of the portable device and the receivable range in the activation state of the portable device, and the in-vehicle authentication device transmits the call signal.
Figure 5B:
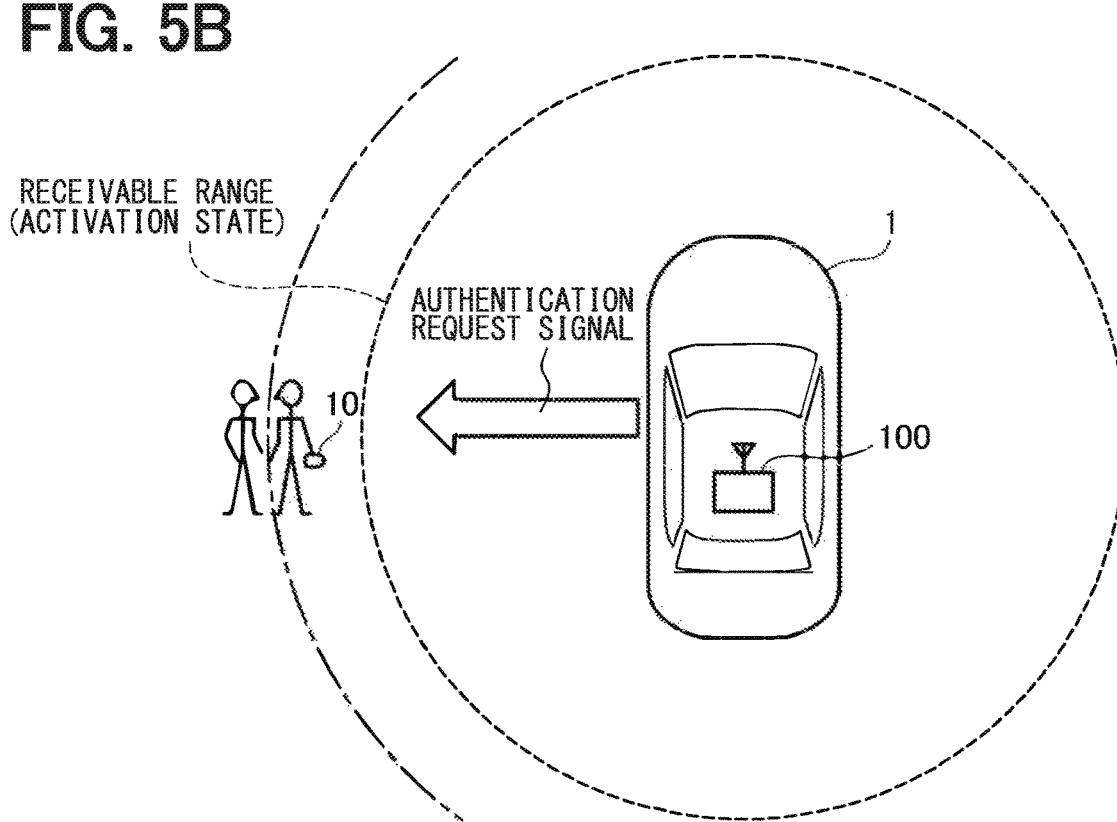
FIG. 5B is a diagram showing a situation in which the portable device exists between the receivable range in the standby state of the portable device and the receivable range in the activation state of the portable device, and the in-vehicle authentication device transmits the authentication request signal.

On the other hand, even though the owner of the portable device 10 has approached the vehicle 1 within the receivable range in the standby state, the owner may not approach further for some reason. FIGS. 5A and 5B show, as an example, a case where the owner of the portable device 10 starts talking in a place that falls within the receivable range in the standby state.

In this case, as described above with reference to FIG. 3A, the reception of a short signal such as the call signal can be completed before the reception sensitivity of the portable device 10 is lowered (see FIG. 5A). When a long signal such as the authentication request signal is received, the portable device 10 is switched to the activation state. Thus, the portable device 10 comes out of the receivable range of the authentication request signal in the activation state (see FIG. 5B). For this reason, the in-vehicle authentication device 100 determines that the portable device 10 is gone because the authentication signal does not return despite the transmission of the authentication request signal, and transmits the call signal again.

Since the call signal is provided by the short signal, the reception can be completed before the portable device 10 switches from the standby state to the activation state, and the response signal is returned from the portable device 10 (see FIG. 5A). The authentication request signal is provided by the long signal. Thus, when the authentication request signal is transmitted again from the in-vehicle authentication device 100, the portable device 10 switches from the standby state to the activation state in the middle of the reception of the authentication request signal and the reception cannot be completed. For this reason, since the authentication signal is not returned from the portable device 10 (see FIG. 5B), the in-vehicle authentication device 100 transmits the call signal again.

As described above, the owner of the portable device 10 may have approached the vehicle 1 within the receivable range in the standby state, but may not approach any further. In this case, the in-vehicle authentication device 100 transmits the call signal to the portable device 10 many times, and each time the portable device 10 returns the response signal. As a result, it is considered that the battery of the portable device 10 is suddenly consumed. Therefore, the in-vehicle authentication device 100 according to the present embodiment authenticates the portable device 10 by the following method in order to reduce such a situation.

Figure 6:
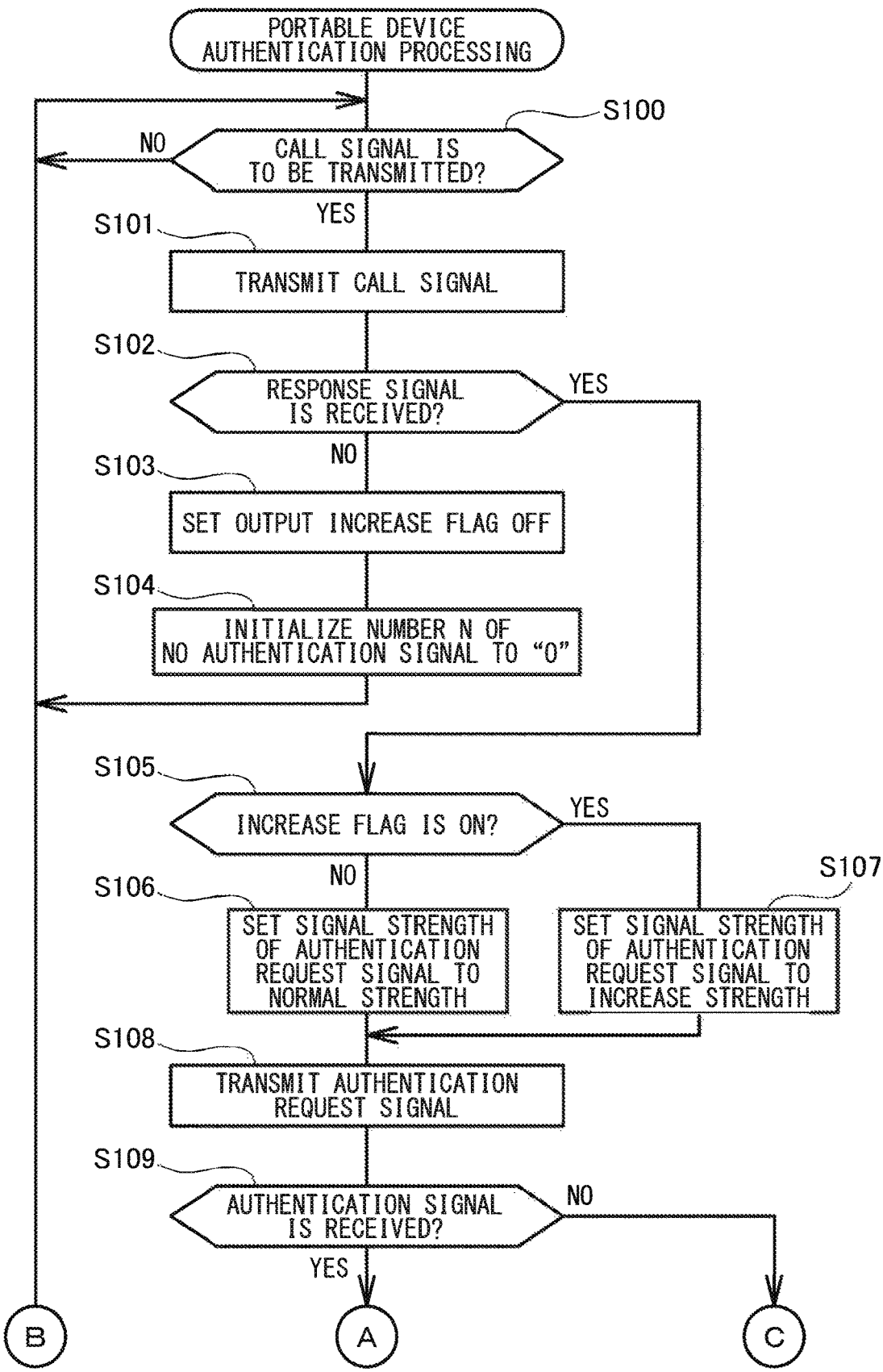
FIG. 6 is a flowchart showing a former half of a portable device authentication processing according to the present embodiment in which the in-vehicle authentication device authenticates the portable device.
Figure 7:
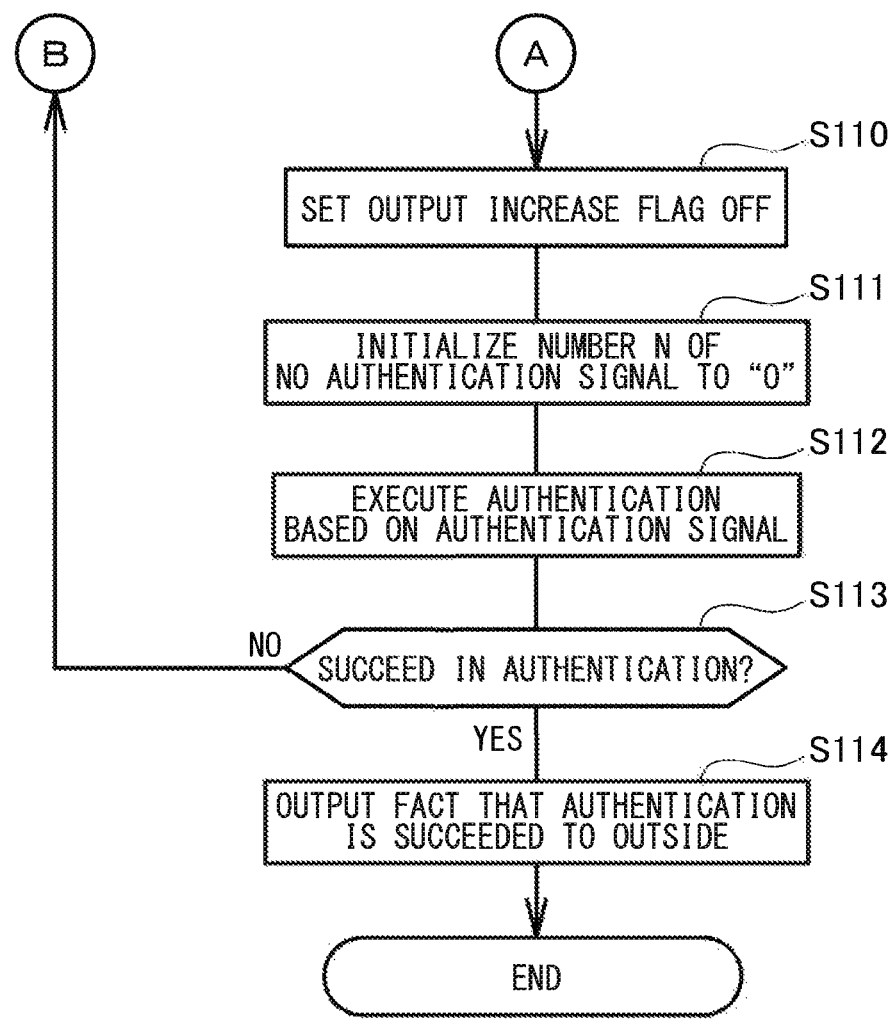
FIG. 7 is a flowchart showing a part of latter half of the portable device authentication processing according to the present embodiment.
Figure 8:
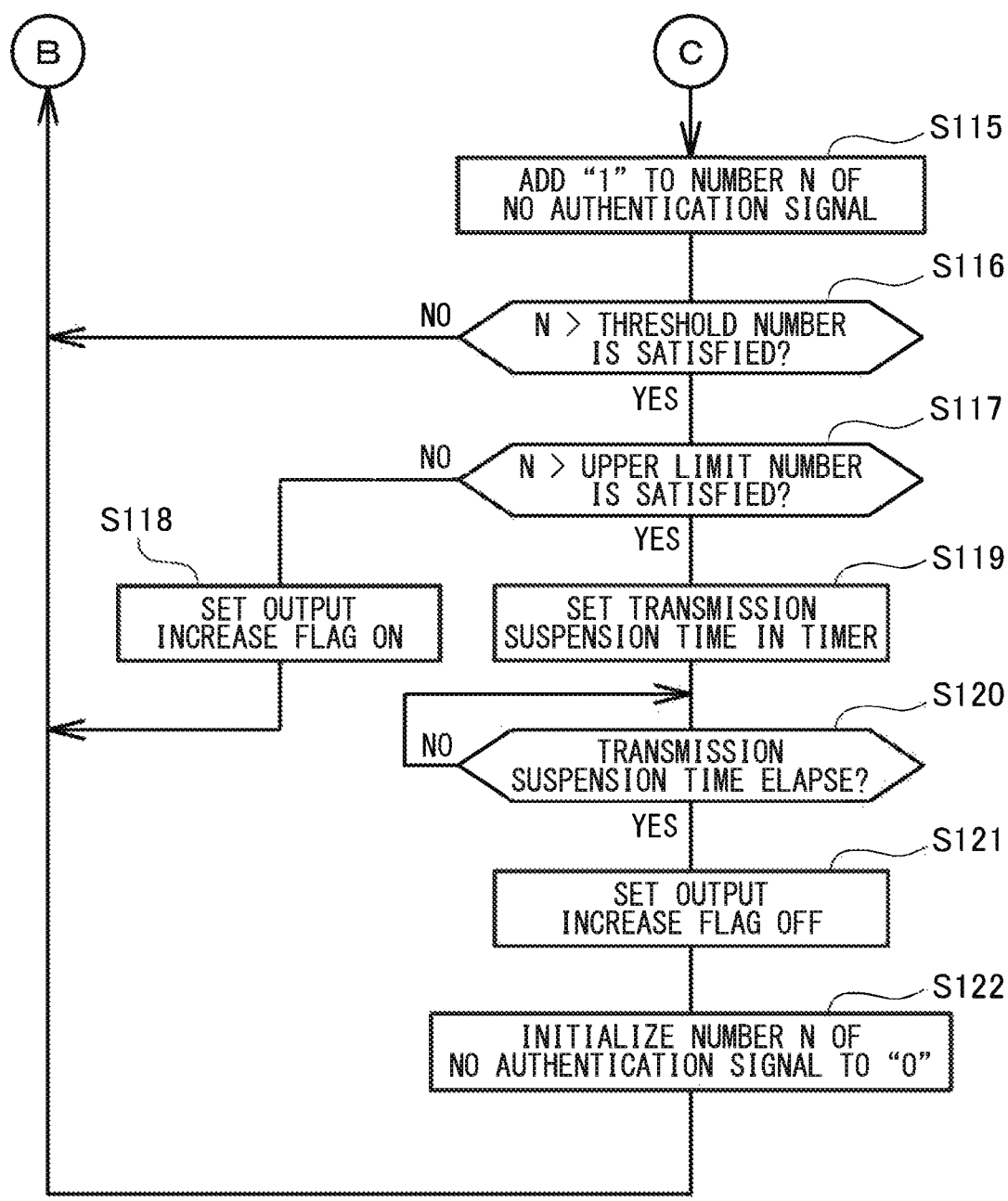
FIG. 8 is a flowchart showing a remaining part of latter half of the portable device authentication processing according to the present embodiment.

FIGS. 6 to 8 show a flowchart of a portable device authentication processing to authenticate the portable device 10 by the in-vehicle authentication device 100 according to the present embodiment.

As shown in the figures, in the portable device authentication processing, the in-vehicle authentication device 100 determines whether to transmit the call signal (S100). Since the call signal is transmitted at a constant cycle, when the elapsed time since the previous call signal was transmitted does not reach the predetermined time, the in-vehicle authentication device 100 determines not to transmit the call signal (S100: no). Further, when a genuine portable device 10 has already been authenticated, the in-vehicle authentication device 100 determines not to transmit the call signal (S100: no). When the in-vehicle authentication device 100 determines not to transmit the call signal (S100: no), the same determination (S100) is repeated and the in-vehicle authentication device 100 enters a waiting state until determining to transmit the call signal.

On the other hand, when the predetermined time has passed since the previous call signal was transmitted and the genuine portable device 10 has not been authenticated, the in-vehicle authentication device 100 determines to transmit the call signal (S100: yes) and wirelessly transmits the predetermined call signal (S101).

Next, the in-vehicle authentication device 100 determines whether the response signal from the terminal device 10 is received (S102). When the portable device 10 exists within the reach of the radio wave from the in-vehicle authentication device 100, the response signal should be returned within a certain time after the call signal is transmitted.

Therefore, when the in-vehicle authentication device 100 cannot receive the response signal within a certain time (S102: no), the output increase flag is set to OFF (S103), the number N of no-authentication signals is initialized to "0", and the processing returns to the first process to determine whether to transmit the call signal (S100). The output increase flag is provided by a flag indicating whether to increase the signal output from the normal output when transmitting the authentication request signal. The output increase flag is set to OFF in a normal state, but is set to ON when a predetermined condition described later is satisfied. The number N of no-authentication signals is a variable used for counting the number of times of the consecutive occurrence of the no-authentication signal state, which is an abnormal state. As will be described later, in the portable device authentication processing of the present embodiment, when the response signal from the portable device 10 is received, the presence or absence of the no-authentication signal state is detected and the output increase flag is set to ON in a case where the no-authentication signal state is consecutively generated for a predetermined number of times. For this reason, when the response signal in response to the call signal does not return (S102: no), it is not necessary to count the number N of no-authentication signals and it is not necessary to turn ON the output increase flag. Thus, the output increase flag is set to OFF, and the number N of no-authentication signals is also initialized to "0" (S103, S104).

On the other hand, when the in-vehicle authentication device 100 receives the response signal (S102: yes), the in-vehicle authentication device 100 determines whether the output increase flag is set to ON (S105). As described above, since the output increase flag is set to OFF in the normal state, it is determined as "no" in S105, and the signal strength of the authentication request signal is set to the normal strength (S106). On the other hand, when the output increase flag is set to ON, it is determined as "yes" in S105, and the signal strength of the authentication request signal is set to an increased strength greater than the normal strength (S107). In the present embodiment, the increased strength is set to a strength that is about 1 db greater than the normal strength.

When the signal strength of the authentication request signal is set as described above (S106, S107), the in-vehicle authentication device 100 transmits the authentication request signal with the set signal strength (S108) and determines whether the authentication signal is received from the portable device 10 (S109). The authentication request signal is a signal that is transmitted when the response signal is received, and the fact that the response signal is received indicates that the portable device 10 exists nearby. Thus, after the in-vehicle authentication device 100 transmits the authentication request signal, the authentication signal is usually returned from the portable device 10 during a certain period of time.

When the in-vehicle authentication device 100 receives the authentication signal (S109: yes), the portable device 10 is authenticated based on the authentication signal, but prior to the authentication, the output increase flag is set to OFF (S110 in FIG. 7), and further, the number N of no-authentication signals is initialized to "0" (S111). That is, as will be described later, the output increase flag and the number N of no-authentication signals are a flag and a variable used when the authentication signal cannot be received. Therefore, when the authentication signal can be received (S109: yes), it is not necessary to use the flag or the variable. In preparation for the next use, the output increase flag is set to OFF and the number N of no-authentication signals is initialized to "0" (S110, S111).

Thereafter, the in-vehicle authentication device 100 authenticates the portable device 10 based on the received authentication signal (S112). The in-vehicle authentication device 100 determines whether the authentication succeeds (S113). When the authentication succeeds (S113: yes), the in-vehicle authentication device 100 transmits the fact that the authentication succeeds to the outside (S114) and terminates the above described portable device authentication processing.

On the other hand, when the authentication fails (S113: no), the in-vehicle authentication device 100 determines that the authenticated portal device 10 is not a genuine portal device 10. Thus, in order to authenticate a genuine portal device 10, the in-vehicle authentication device 100 returns to the first process, and again determines whether to transmit the call signal (S100 in FIG. 6).

The processes have been described for authenticating the portable device 10 based on the authentication signal when the authentication signal in response to the authentication request signal has been received (S109: yes).

When the authentication request signal is transmitted, the authentication signal may not be received. That is, the authentication request signal is a signal that is transmitted when the response signal is returned, and that the response signal is returned indicates that the portable device 10 is present in a range where the call signal reaches. Under usual situation, the authentication signal can be received. The portable device 10 may moves away after the call signal is transmitted and before the authentication request signal is transmitted, or, as shown in FIGS. 5A and 5B, the portable device 10 stays at the place where the call signal is received. In this case, the authentication signal cannot be received even though the authentication request signal is transmitted. Such a state is the no-authentication signal state.

When the authentication signal is not received even though the authentication request signal is transmitted (S109: no), "1" is added to the number N of no-authentication signals (S115 in FIG. 8). As described above, the number N of no-authentication signals is the variable used for counting the number of times of the consecutive occurrence of the no-authentication signal state.

Subsequently, the in-vehicle authentication device 100 determines whether the number N of no-authentication signals is greater than a predetermined threshold number (S116). The predetermined threshold number is also referred to as a first predetermined number of times. The threshold number can be set to an appropriate value. In the present embodiment, the threshold number is set to three.

As a result, when the number N of no-authentication signals has not reached the threshold number (S116: no), the in-vehicle authentication device 100 returns to the first process of the processing and determines again whether to transmit the call signal (S100 in FIG. 6). When the in-vehicle authentication device 100 transmits the call signal (S101) and receives the response signal corresponding to the call signal (S102: yes), the in-vehicle authentication device 100 transmits the authentication request signal (S108) and determines whether the authentication signal is received (S109). When the authentication signal is not received (S109: no), the in-vehicle authentication device 100 determines whether the number N of no-authentication signals has reached the predetermined threshold number (S116) after adds "1" again to the number N of no-authentication signals (S115 in FIG. 8).

While the in-vehicle authentication device 100 repeats such processes, the response signal in response to the call signal may not be received (S102 in FIG. 6: no) or the authentication signal in response to the authentication request signal may be received (S109: yes). In this case, the output increase flag is set to OFF (S103, S110 in FIG. 7), and the number N of no-authentication signals is also initialized to "0" (S104, S111 in FIG. 7).

When the number N of no-authentication signals reaches the threshold number (S116 in FIG. 8: yes), the in-vehicle authentication device 100 determines whether the number N of no-authentication signals has reached a predetermined upper limit number (S117). The predetermined upper limit number is also referred to as a second predetermined number of times. The upper limit number can be set to an appropriate value greater than the threshold number. In the present embodiment, the threshold number is set to six. Even when the number N of no-authentication signals reaches the threshold number, the number N of no-authentication signals is smaller than the upper limit number for a while, so that it is determined as "no" in S117. In the case of (S117: no), the output increase flag is set to ON (S118).

After the output increase flag is set to ON (S118), the in-vehicle authentication device 100 returns to the first process of the processing and repeats the above-described series of processes. That is, the in-vehicle authentication device 100 determines whether to transmit the call signal (S100 in FIG. 6), and transmits the call signal (S101). When the in-vehicle authentication device 100 receives the response signal in response to the call signal (S102: yes), the in-vehicle authentication device 100 determines whether the output increase flag is set to ON (S105). After the in-vehicle authentication device 100 determines that the output increase flag is set to ON (S105: yes) and set the signal strength to the increased strength (S107), the in-vehicle authentication device 100 transmits the authentication request signal with the increased strength (S108).

With the above described configuration, when the in-vehicle authentication device 100 transmits the authentication request signal with the signal strength stronger than the normal strength, it is possible to reduce a situation in which the battery of the portable device 10 is suddenly consumed even in the case shown in FIGS. 5A and 5B.

Figure 9A:
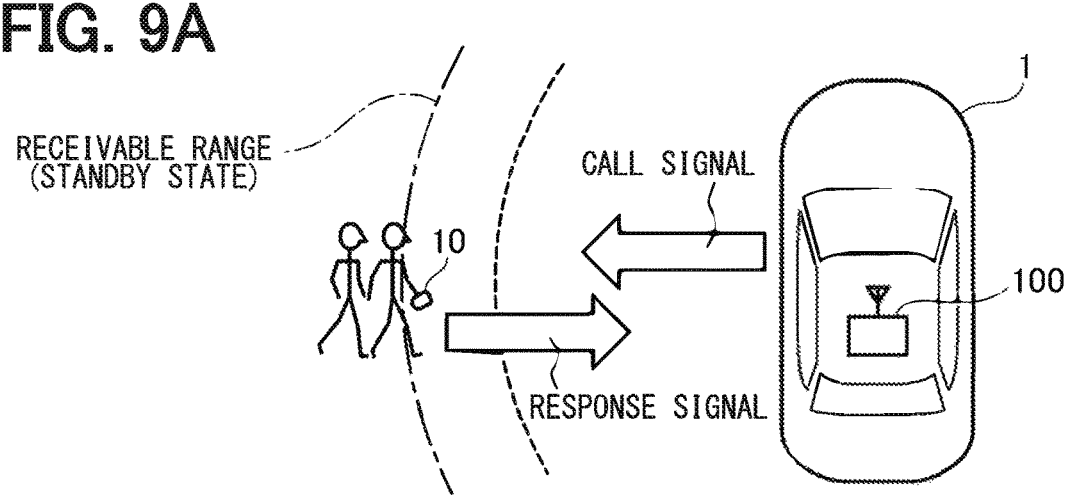
FIG. 9A is a diagram showing a situation in which the portable device is entering the receivable range of the standby state for radio wave from the in-vehicle authentication device.
Figure 9B:
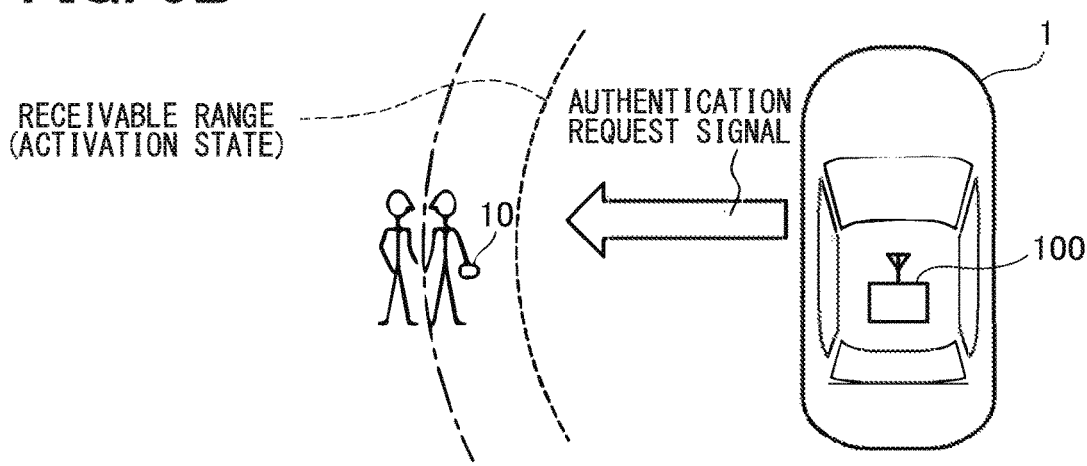
FIG. 9B is a diagram showing a situation in which the portable device exists between the receivable range in the standby state of the portable device and the receivable range in the activation state of the portable device, and the in-vehicle authentication device transmits the authentication request signal.
Figure 9C:
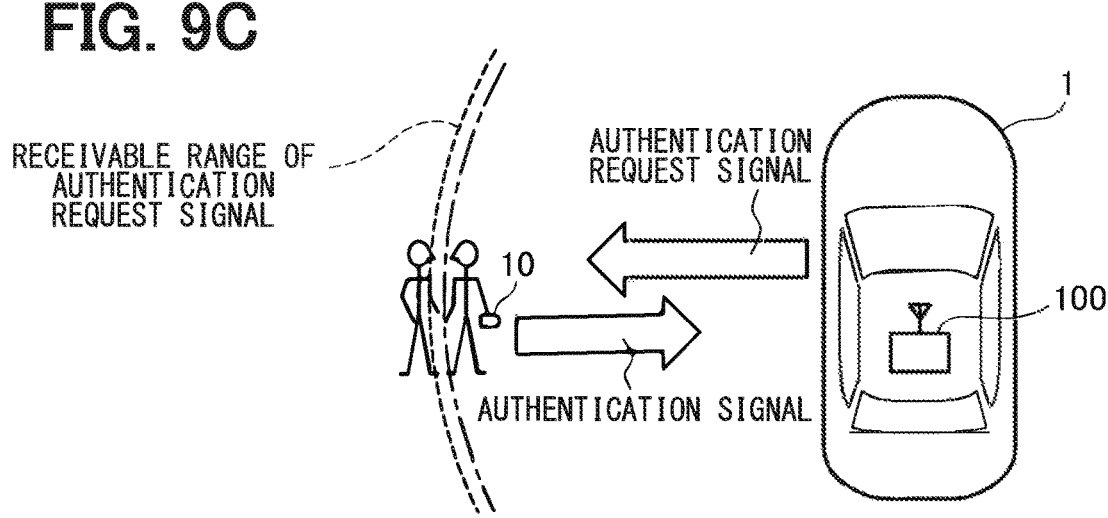
FIG. 9C is a diagram showing a situation in which a reachable range of radio wave form the in-vehicle authentication device extends.

FIGS. 9A to 9C show the situation in which the battery of the portable device 10 is suddenly consumed can be reduced by transmitting the authentication request signal with the signal strength stronger than the normal strength. As shown in FIG. 9A, when the portable device 10 moves toward the vehicle 1, the call signal from the in-vehicle authentication device 100 is received and the response signal is returned at the state where the portable device 10 moves into the radio wave receivable range in the standby state. At this time, the portable device 10 is switched from the standby state to the activation state. When the portable device 10 is in the activation state, the reception sensitivity for the radio wave is lower than that in the standby state. As shown in FIG. 9B, when the owner of the portable device 10 stops at the position entering the radio wave receivable range of the standby state, the portable device 10 cannot receive the authentication request signal from the in-vehicle authentication device 100.

In this case, in the terminal device authentication processing, the in-vehicle authentication device 100 determines that the authentication signal cannot be received (S109: no) even though the authentication request signal has been transmitted (S108 in FIG. 6), so that the in-vehicle authentication device 100 adds "1" to the number N of no-authentication signals (S115 in FIG. 8). Thereafter, the call signal is transmitted again, and when the response signal is returned, the authentication request signal is transmitted (S100 to S108 in FIG. 6), but when the authentication signal cannot be received (S109: no), "1" is added again to the number N of no-authentication signals (S115 in FIG. 8).

When these processes are repeated and the number N of no-authentication signals reaches the threshold number (S116: yes), the output increase flag is set to ON (S118), and the authentication request signal is transmitted with the strong signal strength. (S107 and S108 in FIG. 6).

As a result, as shown in FIG. 9C, the receivable range of the authentication request signal is expanded, so that the authentication request signal can be received even when the portable device 10 is in the activation state and the authentication signal can be returned. Thus, the configuration can reduce the sudden consumption of the battery of the portable device 10 in a case where the response signal is returned each time the in-vehicle authentication device 100 transmits the call signal for many times since the authentication signal does not return.

The state in which the response signal in response to the call signal returns but the authentication signal in response to the authentication request signal does not return even though the signal strength of the authentication request signal has increased, that is, the no-authentication signal state has continues. In this case, it is considered that there is highly possibility that some trouble has occurred in the portable device 10. Thus, the portable device 10 cannot transmit the authentication signal. In such a case, when the transmission of the authentication request signal with the strong signal strength is repeated, the power consumption of the in-vehicle authentication device 100 increases.

In the portable device authentication processing of the present embodiment, even after the number N of no-authentication signals reaches the threshold number (S116 in FIG. 8: yes) and the output increase flag is set to ON (S118), the authentication signal in response to the authentication request signal cannot be received. In this case, the in-vehicle authentication device 100 continues the count of the number N of no-authentication signals (S115).

When the number N of no-authentication signals reaches the upper limit number (S117: yes), a predetermined transmission suspension time is set in the timer (S119), and the in-vehicle authentication device 100 determines whether the transmission suspension time has elapsed (S120). The transmission suspension time can be set to an appropriate time. In the present embodiment, the transmission suspension time is set to one minute.

As a result, when the transmission suspension time has not elapsed (S120: no), the in-vehicle authentication device 100 enters the waiting state by repeating the determination of S120. When the transmission suspension time has elapsed (S120: yes), the output increase flag is set to OFF (S121), the number N of no-authentication signals is initialized to "0", the in-vehicle authentication device 100 returns to the first process of the processing again, and repeats the series of processes.

A trouble may occur in the portable device 10 and the response signal can be transmitted but the authentication signal cannot be transmitted. In this case, the configuration can reduce a situation in which the power consumption of the in-vehicle authentication device 100 increases.

In the above described embodiment, the authentication request signal is transmitted with the constant strong signal strength while the output increase flag is set to ON. When the output increase flag is set to ON, the authentication request signal is transmitted with a signal strength stronger than the normal strength, and the signal strength may be increased each time the authentication request signal is transmitted. With this configuration, the authentication request signal can be reliably received by the portable device 10 while the authentication request signal is transmitted several times. Thus, it is possible to reliably reduce a situation where the battery of the portable device 10 is suddenly consumed.

Modification

In the portable device authentication processing according to the present embodiment described above, the signal strength of the authentication request signal is increased when the number N of no-authentication signals reaches the predetermined threshold number. It is possible to reduce a situation where the battery of the portable device 10 is suddenly consumed by reducing the signal strength of the call signal instead of increasing the signal strength of the authentication request signal.

Figure 10:
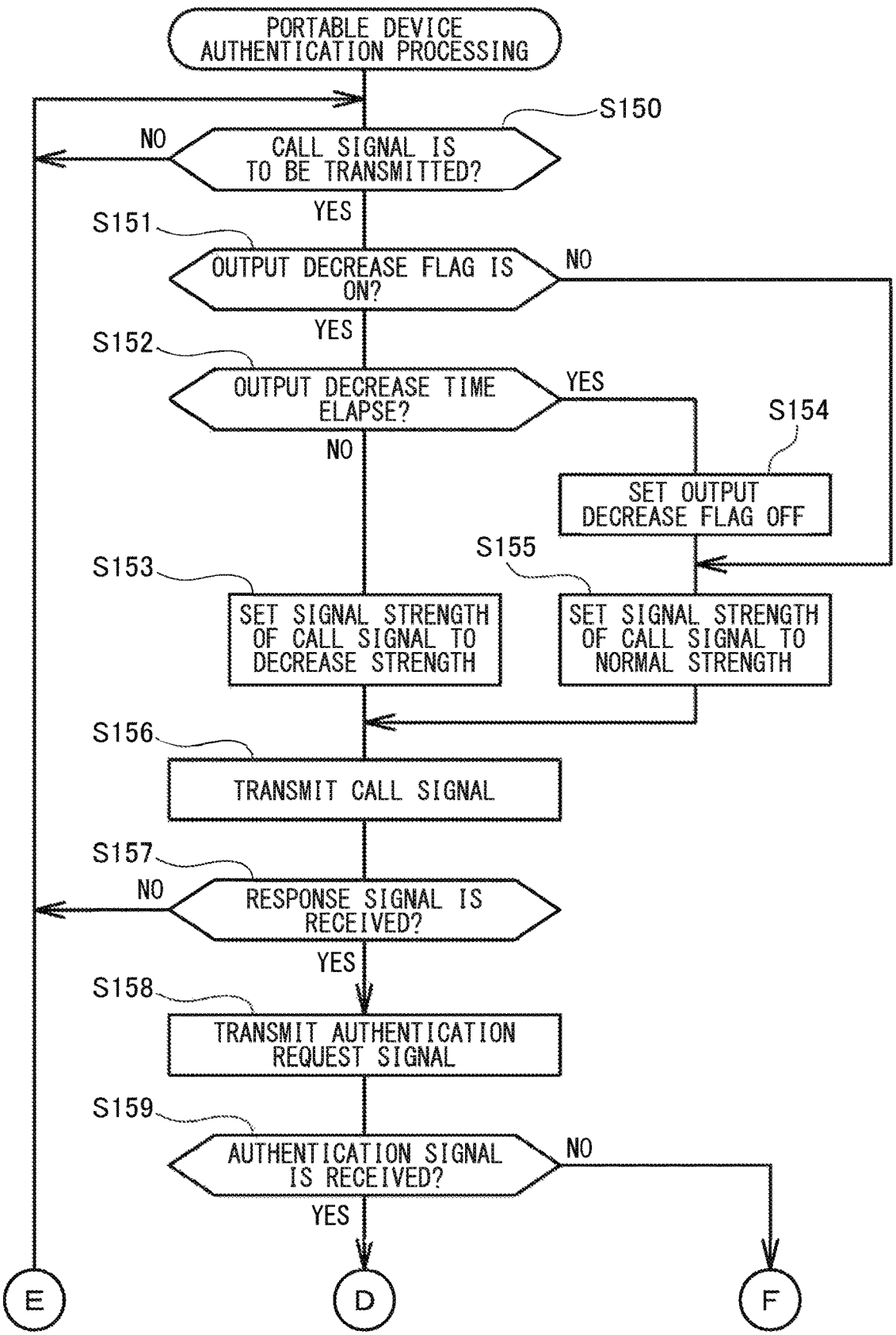
FIG. 10 is a flowchart showing a former half of a portable device authentication processing according to a modification.
Figure 11:
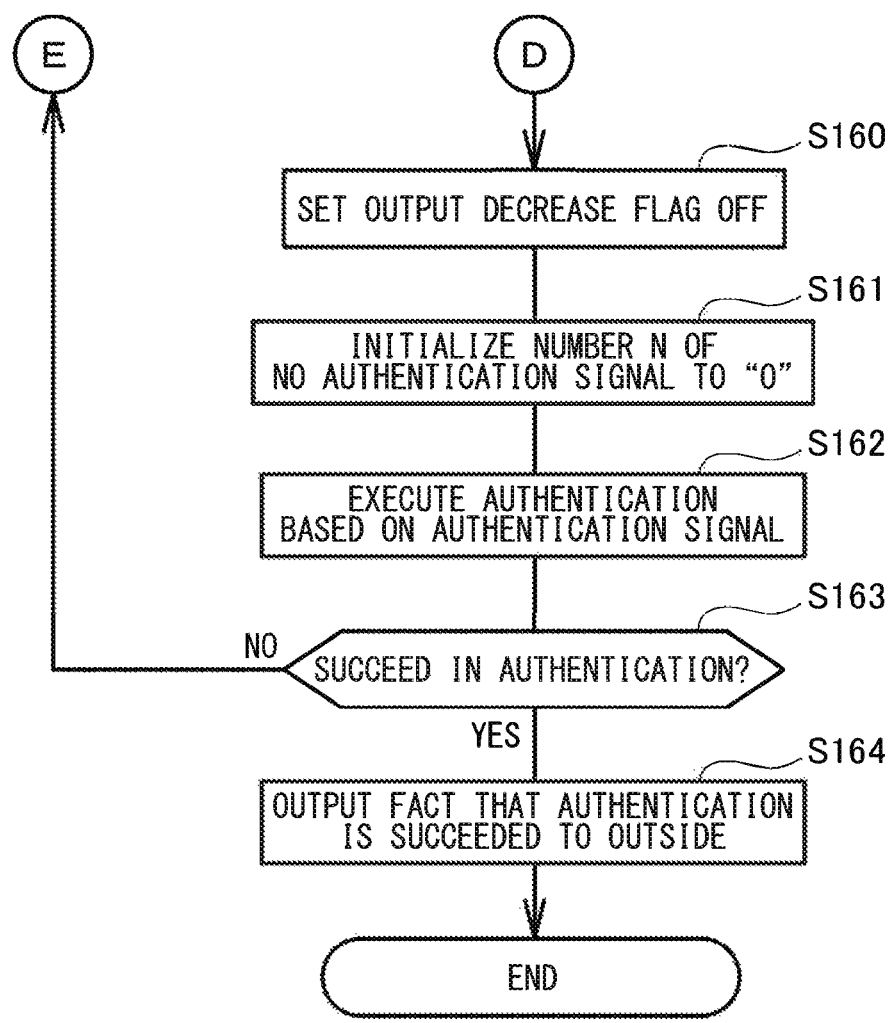
FIG. 11 is a flowchart showing a part of latter half of the portable device authentication processing according to the modification.
Figure 12:
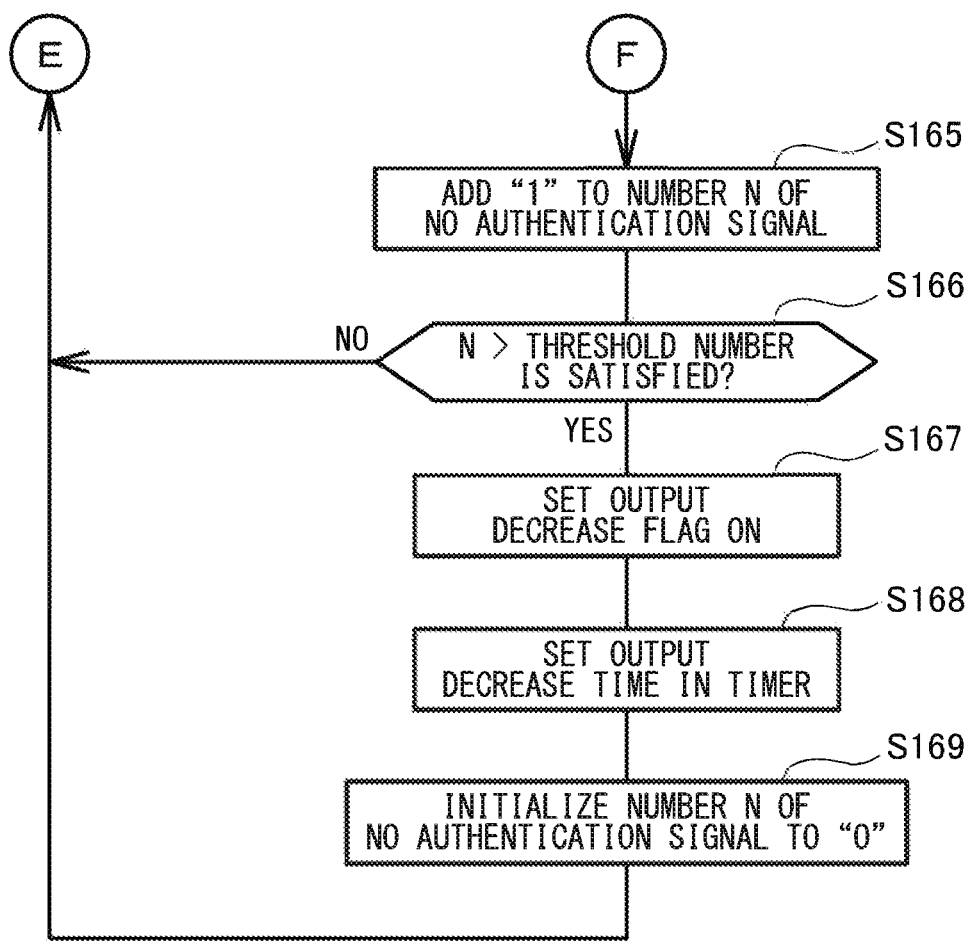
FIG. 12 is a flowchart showing a remaining part of latter half of the portable device authentication processing according to the modification.

FIGS. 10 to 12 show a flowchart of a portable device authentication processing according to the above described modification. This processing differs from the portable device authentication processing of the above described embodiment in the point that the signal strength of the call signal is weakened by setting the output decrease flag to ON when the number N of no-authentication signals reaches the predetermined threshold number, and the condition for returning the output decrease flag set from ON to OFF. Hereinafter, the portable device authentication processing of the modification will be briefly described focusing on the above difference.

As shown in FIG. 10, in the portable device authentication processing according to the modification, the in-vehicle authentication device 100 determines whether to transmit the call signal (S150). The call signal is transmitted at a constant cycle. The elapsed time since the previous call signal was transmitted has not reached the predetermined time, or the authorized portable device 10 has already been authenticated. In this case, the in-vehicle authentication device 100 determines not to transmit the call signal (S150: no), and enters the standby state by repeating the determination of S150.

As a result, when the in-vehicle authentication device 100 determines to transmit the call signal (S150: yes), the in-vehicle authentication device 100 determines whether the output decrease flag is set to ON (S151). Here, the output decrease flag is a flag indicating whether the signal strength of the call signal is transmitted with a weaker strength than the normal strength. Since the output decrease flag is set to OFF in the normal state, it is determined as "no" in S151, and the signal strength is set to the normal strength (S155).

On the other hand, when the output decrease flag is set to ON (S151: yes), the in-vehicle authentication device 100 determines whether the output decrease time has elapsed (S152). The output decrease time is a time during which the state in which the call signal is transmitted with a signal strength weaker than the normal strength is continued, and when the output decrease flag is set to ON, the output decrease time is also set. Specific processes for turning on the output decrease flag and setting the output decrease time will be described in detail later.

As a result of determining whether the output decrease time has elapsed, when the in-vehicle authentication device 100 determines that the output decrease time has not elapsed (S152: no), the signal strength of the call signal is set to be weaker than the normal strength (that is, the decreased strength) (S153). When the in-vehicle authentication device 100 determines that the output decrease time has elapsed (S152: yes), after setting the output decrease flag to OFF (S154), the signal strength of the call signal is set to the normal strength (S155).

In this configuration, the output decrease flag is set to ON when a predetermined condition described later is satisfied, and the call signal is transmitted with a weaker signal strength than the normal strength while the output decrease flag is set to ON. After a predetermined output decrease time has elapsed, the output decrease flag is returned to OFF. As a result, the signal strength of the call signal also returns to the normal strength.

When the signal strength of the call signal is set as described above (S153, S155), the in-vehicle authentication device 100 transmits the call signal with the set signal strength (S156) and determines whether the response signal is received from the portable device 10 (S157). When the portable device 10 exists within the reach of the radio wave of the transmitted call signal, the response signal should be returned within a certain time after the call signal is transmitted. When the in-vehicle authentication device 100 cannot receive the response signal within a certain time (S157: no), the in-vehicle authentication device 100 returns to the first process of the processing to determine whether to transmit the call signal (S150).

On the other hand, when the response signal from the portable device 10 is received (S157: yes), the authentication request signal is transmitted (S158). Note that the authentication request signal is transmitted at the normal strength regardless of whether the signal strength of the call signal is set to the normal strength or the decreased strength.

Next, the in-vehicle authentication device 100 determines whether the authentication signal from the terminal device 10 is received (S159). Normally, the authentication signal from the portable device 10 is returned within a certain period of time after the authentication request signal is transmitted. When the in-vehicle authentication device 100 receives the authentication signal (S159: yes), the in-vehicle authentication device 100 sets the output increase flag to OFF (S160 in FIG. 11), initializes the number N of no-authentication signals to "0" (S161), and authenticates the portable device 10 based on the authentication signal (S162). The in-vehicle authentication device 100 determines whether the authentication succeeds (S163). When the authentication succeeds (S163: yes), the in-vehicle authentication device 100 transmits the fact that the authentication succeeds to the outside (S164) and terminates the above described portable device authentication processing according to the modification.

When the authentication fails (S163: no), the in-vehicle authentication device 100 returns to the first process of the processing and determines again whether to transmit the call signal (S150 in FIG. 10).

The processes have been described for authenticating the portable device 10 based on the authentication signal when the authentication signal in response to the authentication request signal has been received (S159: yes).

When the authentication signal is not received even though the authentication request signal is transmitted (S159: no), it is determined that the above-described no-authentication signal state is generated, so that "1" is added to the number N of no-authentication signals (S165 in FIG. 12). As described above, the number N of no-authentication signals represents the number of times of the consecutive occurrence of the no-authentication signal state.

Subsequently, the in-vehicle authentication device 100 determines whether the number N of no-authentication signals is greater than a predetermined threshold number (S166). When the number N of no-authentication signals has not reach the threshold number (S166: no), the in-vehicle authentication device 100 returns to the first process of the processing and determines whether to transmit the call signal (S150 in FIG. 10).

On the other hand, when the no-authentication signal count N has reached the threshold count (S166: yes), after setting the output decrease flag to ON (S167), the in-vehicle authentication device 100 sets the output decrease time in the timer (S168) and further initializes the number N of no-authentication signals to "0" (S169). Thereafter, the in-vehicle authentication device 100 returns to the first process of the processing, and determines whether to transmit the call signal (S150 in FIG. 10).

As described above, the in-vehicle authentication device 100 may detect the no-authentication signal state, in which the authentication signal does not return, even though transmitting the authentication request signal. In this case, when the no-authentication signal state continues for the threshold number of times, the in-vehicle authentication device 100 causes the signal strength of the call signal to be weaker than the normal strength. With this configuration, it is also possible to reduce a situation where the battery of the portable device 10 is suddenly consumed.

Figure 13A:
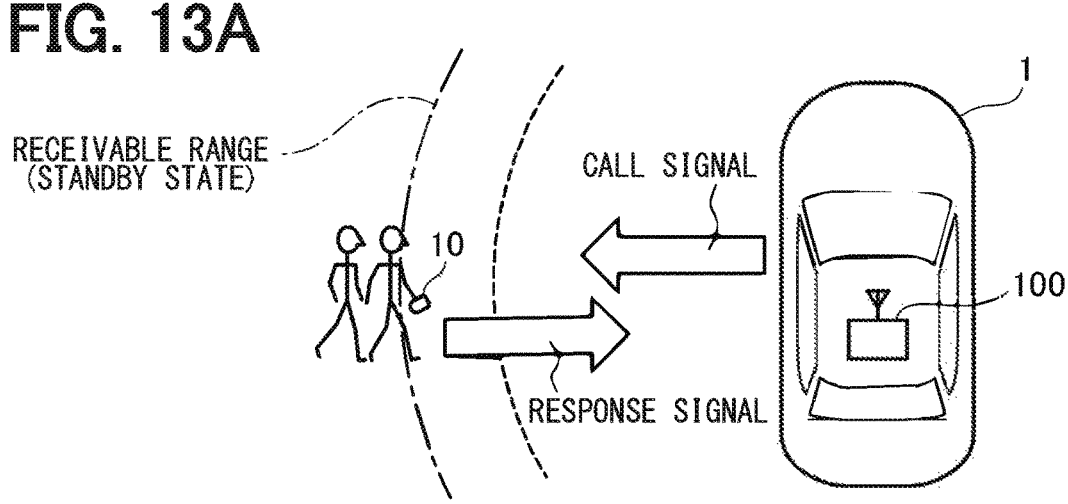
FIG. 13A is a diagram showing a situation in which the portable device is entering the receivable range of the standby stat for radio wave from the in-vehicle authentication device.
Figure 13B:
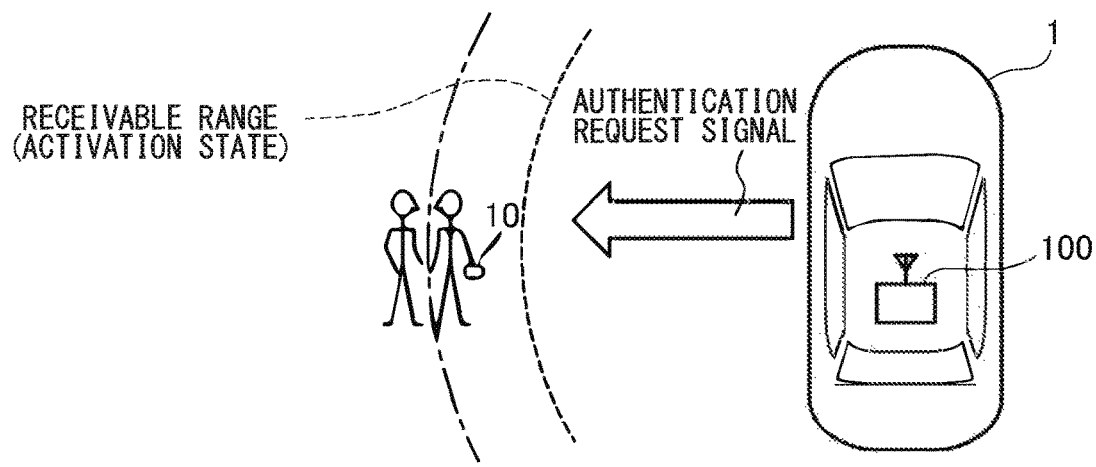
FIG. 13B is a diagram showing a situation in which the portable device exists between the receivable range in the standby state of the portable device and the receivable range in the activation state of the portable device, and the in-vehicle authentication device transmits the authentication request signal.
Figure 13C:
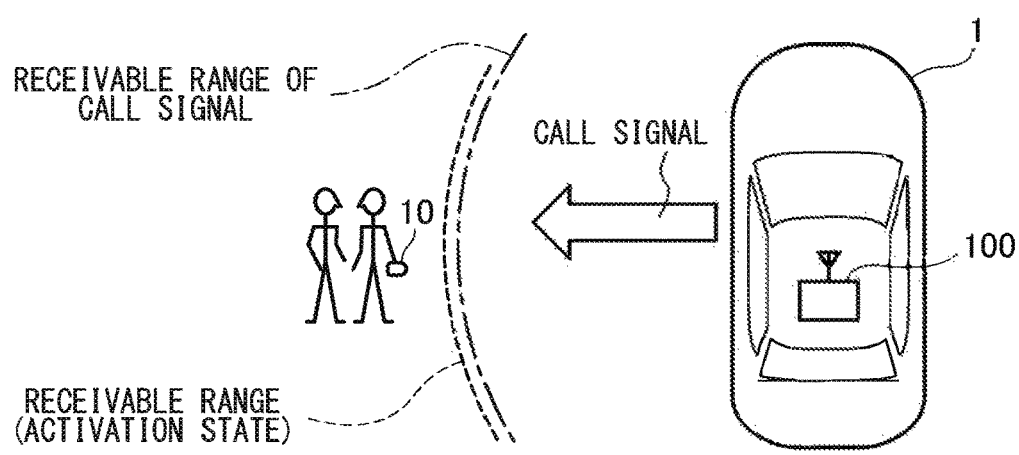
FIG. 13C is a diagram showing a situation in which the reachable range of radio wave form the in-vehicle authentication device becomes small.

FIGS. 13A to 13C show the situation in which the sudden consumption of the battery of the portable device 10 is reduced by weakening the signal strength of the call signal compared with the normal strength. The situation shown in FIGS. 13A to 13C is similar to the situation shown in FIGS. 9A to 9C. FIGS. 13A to 13C show a situation in which the owner of the portable device 10 moves toward the vehicle 1, and stops when the call signal from the in-vehicle authentication device 100 is received.

As shown in FIG. 13A, when receiving the call signal from the in-vehicle authentication device 100, the portable device 10 returns the response signal. At this time, the portable device 10 switches from the standby state to the activation state, and the reception sensitivity of the radio wave is weakened. In this configuration, as shown in FIG. 13B, the portable device 10 cannot receive the authentication request signal from the in-vehicle authentication device 100 and cannot return the authentication signal.

In this case, in the terminal device authentication processing according to the modification, the in-vehicle authentication device 100 determines that the no-authentication signal state occurs (S159: no in FIG. 10), and adds "1" to the number N of no-authentication signals (S165 in FIG. 12). Thereafter, the call signal is transmitted again, and when the response signal is returned, the authentication request signal is transmitted (S150 to S158 in FIG. 10), but when the authentication signal cannot be received (S159: no), "1" is again added to the number N of no-authentication signals (S165 in FIG. 12). When these processes are repeated and the number N of no-authentication signals reaches the threshold number (S166: yes), the output decrease flag is set to ON (S167), and the call signal is transmitted with a signal strength weaker than the normal strength (S153, S156 in FIG. 10).

As a result, as shown in FIG. 13C, the receivable range of the call signal from the in-vehicle authentication device 100 becomes small so that the portable device 10 cannot receive the call signal and does not return the response signal. The above described situation continues until the output decrease time elapses.

Thus, the configuration can reduce the situation at which the portable device 10 returns the response signal each time the in-vehicle authentication device 100 transmits the call signal and the battery of the portable device 10 is suddenly consumed.

In the portable device authentication processing according to the modification, as shown in FIG. 13C, the in-vehicle authentication device 100 continues to transmit the call signal at a constant cycle even when the signal strength becomes weak. The owner with the portable device 10 may approach the vehicle 1 again and enter the receivable range of the call signal. In this case, the in-vehicle authentication device 100 immediately recognizes the approach of the portable device 10 and transmits the authentication request signal. With this configuration, the in-vehicle authentication device 100 can start to authenticate the portable device 10.

A flowchart or a process of the flowchart described in the present disclosure includes multiple parts (or steps), and each part is expressed, for example, as S100. Furthermore, each part may be divided into multiple sub-parts, while the multiple parts may be combined into one part. Each of these sections may also be referred to as a circuit, a device, a module, or means.

Each of the plurality of sections or some of the sections combined to each other can be embodied as (i) a software section combined with a hardware unit (e.g., a computer) or (ii) a hardware section (e.g., an integrated circuit or a wiring logic circuit) including or excluding a function of a relevant device. The hardware section may still alternatively be installed in a microcomputer.

Although the present disclosure has been described in accordance with the examples, it is understood that the disclosure is not limited to such examples or structures. The present disclosure covers various modification examples and equivalent arrangements. In addition, while the various elements are shown in various combinations and configurations, which are exemplary, other combinations and configurations, including more, less or only a single element, are also within the spirit and scope of the present disclosure.

What is claimed is:

1. An in-vehicle authentication device comprising:
   a wireless communication unit configured to perform wireless communication with a portable device in a vicinity of a vehicle;
   a call signal transmission unit configured to transmit a call signal that requests a reply of a response signal to the portable device via the wireless communication unit;
   an authentication request signal transmission unit configured to transmit an authentication request signal that requests a reply of an authentication signal to the portable device via the wireless communication unit when the authentication request signal transmission unit determines that the portable device exists in the vicinity of the vehicle by receiving the response signal via the wireless communication unit, the wireless communication unit transmitting the authentication request signal with a signal strength that is greater than a signal strength of the call signal;
   an authentication execution unit configured to authenticate the portable device that transmits the authentication signal based on the authentication signal when the authentication signal is received via the wireless communication unit;
   a no-authentication signal state detection unit configured to detect a no-authentication signal state in which the authentication signal is not received in response to the authentication request signal;
   a signal strength change unit configured to change at least one of the signal strength of the call signal or the signal strength of the authentication request signal to cause the signal strength of the authentication request signal to be greater than the signal strength of the call signal when the no-authentication signal state is detected;
   wherein:
   the signal strength change unit changes at least one of the signal strength of the call signal or the signal strength of the authentication request signal when the no-authentication signal state is consecutively detected for a first predetermined number of times; and
   the signal strength of the authentication request signal to a normal signal strength after the authentication request signal with an increased signal strength is transmitted for a second predetermined number of times.

2. The in-vehicle authentication device according to claim 1, wherein
the signal strength change unit increases the signal strength of the authentication request signal to cause the signal strength of the authentication request signal to be greater than the signal strength of the call signal.

3. The in-vehicle authentication device according to claim 1, wherein
the signal strength change unit decreases the signal strength of the call signal to cause the signal strength of the authentication request signal to be greater than the signal strength of the call signal.

4. A portable device authentication method comprising:
performing wireless communication with a portable device existing in a vicinity of a vehicle;
transmitting a call signal that requests a reply of a response signal to the portable device;
determining whether the portable device exists in the vicinity of the vehicle based on whether the response signal is received;
transmitting, to the portable device, an authentication request signal that requests a reply of an authentication signal with a signal strength that is greater than a signal strength of the call signal based on the determination that the portable device exists in the vicinity of the vehicle when the response signal is received;
authenticating the portable device that transmits the authentication signal based on the authentication signal when the authentication signal is received;
detecting a no-authentication signal state in which the authentication signal is not received in response to the authentication request signal;
changing at least one of the signal strength of the call signal or the signal strength of the authentication request signal to cause the signal strength of the authentication request signal to be greater than the signal strength of the call signal when the no-authentication signal state is detected;
changing at least one of the signal strength of the call signal or the signal strength of the authentication request signal when the no-authentication signal state is consecutively detected for a first predetermined number of times; and
restoring the signal strength of the authentication request signal to a normal signal strength after the authentication request signal with an increased signal strength is transmitted for a second predetermined number of times.

5. An in-vehicle authentication device comprising a memory and a processor configured to:
perform wireless communication with a portable device in a vicinity of a vehicle;
transmit a call signal that requests a reply of a response signal to the portable device;
transmit an authentication request signal that requests a reply of an authentication signal to the portable device when the processor determines that the portable device exists in the vicinity of the vehicle by receiving the response signal, the authentication request signal being transmitted with a signal strength that is greater than a signal strength of the call signal;
authenticate the portable device that transmits the authentication signal based on the authentication signal when the authentication signal is received;
detect a no-authentication signal state in which the authentication signal is not received in response to the authentication request signal;
change at least one of the signal strength of the call signal or the signal strength of the authentication request signal to cause the signal strength of the authentication request signal to be greater than the signal strength of the call signal when the no-authentication signal state is detected;
change at least one of the signal strength of the call signal or the signal strength of the authentication request signal when the no-authentication signal state is consecutively detected for a first predetermined number of times; and
restore the signal strength of the authentication request signal to a normal signal strength after the authentication request signal with an increased signal strength is transmitted for a second predetermined number of times.

* * * * *